(12) United States Patent
Ross et al.

(10) Patent No.: US 9,539,892 B2
(45) Date of Patent: Jan. 10, 2017

(54) AUTOMATED MANUAL TRANSMISSION WITH ELECTRIC MOTOR-GENERATOR

(71) Applicant: GM GLOBAL TECHNOLOGY OPERATIONS LLC, Detroit, MI (US)

(72) Inventors: Craig S. Ross, Ypsilanti, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 13/905,465

(22) Filed: May 30, 2013

(65) Prior Publication Data

US 2014/0352491 A1 Dec. 4, 2014

(51) Int. Cl.
| | |
|---|---|
| *F16H 37/06* | (2006.01) |
| *B60K 6/42* | (2007.10) |
| *B60K 6/48* | (2007.10) |
| *B60K 6/547* | (2007.10) |
| *F16H 3/08* | (2006.01) |

(52) U.S. Cl.
CPC . *B60K 6/42* (2013.01); *B60K 6/48* (2013.01); *B60K 6/547* (2013.01); *F16H 2003/0811* (2013.01); *F16H 2003/0826* (2013.01); *Y02T 10/6221* (2013.01); *Y10S 903/902* (2013.01); *Y10T 74/19014* (2015.01)

(58) Field of Classification Search
CPC ............. B60K 6/485; B60K 6/42; B60K 6/48; B60K 2006/4833; B60K 2006/4841; F16H 2061/0122; F16H 2200/0021; F16H 2200/0039
USPC .......................................... 74/330, 331, 335
See application file for complete search history.

(56) References Cited

U.S. PATENT DOCUMENTS

| | | | | |
|---|---|---|---|---|
| 6,695,082 | B2 * | 2/2004 | Bitsche et al. ............. | 180/65.25 |
| 7,540,823 | B2 * | 6/2009 | Kilian et al. ...................... | 477/3 |
| 8,485,056 | B2 * | 7/2013 | Ross ................................ | 74/330 |
| 2010/0234173 | A1* | 9/2010 | Miyazaki et al. ................. | 477/5 |
| 2011/0269599 | A1* | 11/2011 | Nakasako ......................... | 477/5 |
| 2013/0345019 | A1* | 12/2013 | Kaltenbach et al. ............. | 477/5 |

FOREIGN PATENT DOCUMENTS

DE   102012016990 A1 * 1/2014

* cited by examiner

*Primary Examiner* — William Kelleher
*Assistant Examiner* — Zakaria Elahmadi
(74) *Attorney, Agent, or Firm* — Quinn Law Group

(57) ABSTRACT

The transmission includes an input shaft rotatable about a first axis of rotation, and a countershaft arranged substantially parallel with the input shaft and rotatable about a second axis of rotation. An output member is operatively connected to rotate in unison with the countershaft. Multiple pairs of intermeshing gears are included, each having a respective synchronizable gear that rotates about one of the input shaft and the countershaft, and a respective fixed gear mounted to the other one of the input shaft and the countershaft to rotate in unison therewith. An electric motor has a rotor concentric with and rotatable about the first axis of rotation. A first synchronizer is selectively engageable to synchronize rotation of the rotor with the input shaft. A second synchronizer is selectively engageable to synchronize rotation of the rotor with one of the synchronizable gears that rotates about the input shaft.

13 Claims, 3 Drawing Sheets

AUTOMATED MANUAL TRANSMISSION WITH ELECTRIC MOTOR-GENERATOR

TECHNICAL FIELD

The present teachings generally include a transmission with torque-transmitting mechanisms such as synchronizers that engage different gear pairs to establish different gear ratios.

BACKGROUND

Automated manual transmissions use a computer to control the shifting of gears rather than a driver-operated clutch. Unlike automatic transmissions, an automated manual transmission usually has a clutched connection to the engine, rather than a torque converter connection. Because a driver does not control the shifting of the transmission, the temporary disruption of powerflow from the engine through the transmission during a shift can be more surprising than in a manual transmission.

SUMMARY

The transmission disclosed herein is a relatively low cost, easily packageable transmission. As explained herein, an electric motor can be used for torque assist, engine starting, regenerative braking, and for torque fill during a gear ratio shift. The transmission includes an input shaft rotatable about a first axis of rotation, and a countershaft arranged substantially parallel with the input shaft and rotatable about a second axis of rotation. An output member is operatively connected to rotate in unison with the countershaft. Multiple pairs of intermeshing gears are included, each having a respective synchronizable gear that rotates about one of the input shaft and the countershaft, and a respective fixed gear mounted to the other one of the input shaft and the countershaft to rotate in unison therewith. Each pair of intermeshing gears establishes a different gear ratio of torque of the countershaft to torque of the input shaft when the respective synchronizable gear is operatively engaged with the input shaft or the countershaft.

An electric motor has a rotor that is concentric with and rotatable about the first axis of rotation. A plurality of selectively engageable synchronizers includes a first synchronizer and a second synchronizer. Each of the pairs of intermeshing gears requires engagement of at least one of the synchronizers to synchronize the respective synchronizable gear with the respective one of the input shaft or the countershaft. The first synchronizer is selectively engageable to synchronize rotation of the rotor with the input shaft. The second synchronizer is selectively engageable to synchronize rotation of the rotor with one of the synchronizable gears that rotates about the input shaft. The electric motor is thereby operable to apply torque at the input shaft when the first synchronizer is engaged. A transmission controller is operable to control engagement of the synchronizers.

The above features and advantages and other features and advantages of the present invention are readily apparent from the following detailed description of the best modes for carrying out the invention when taken in connection with the accompanying drawings.

DETAILED DESCRIPTION

Figure 1:
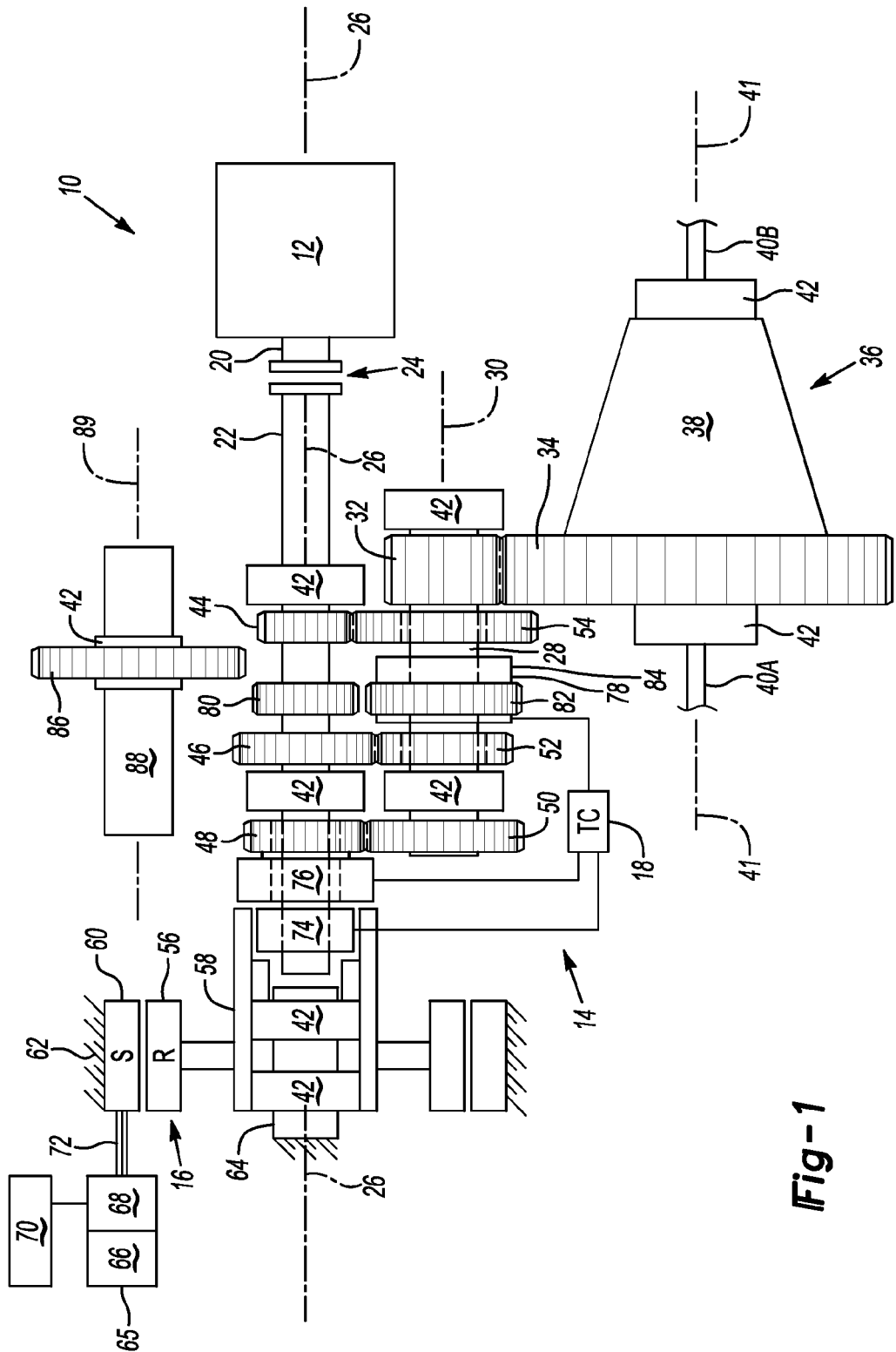
FIG. 1 is a schematic illustration in side view of a hybrid powertrain with wheel axles shown in fragmentary view.
Figure 2:
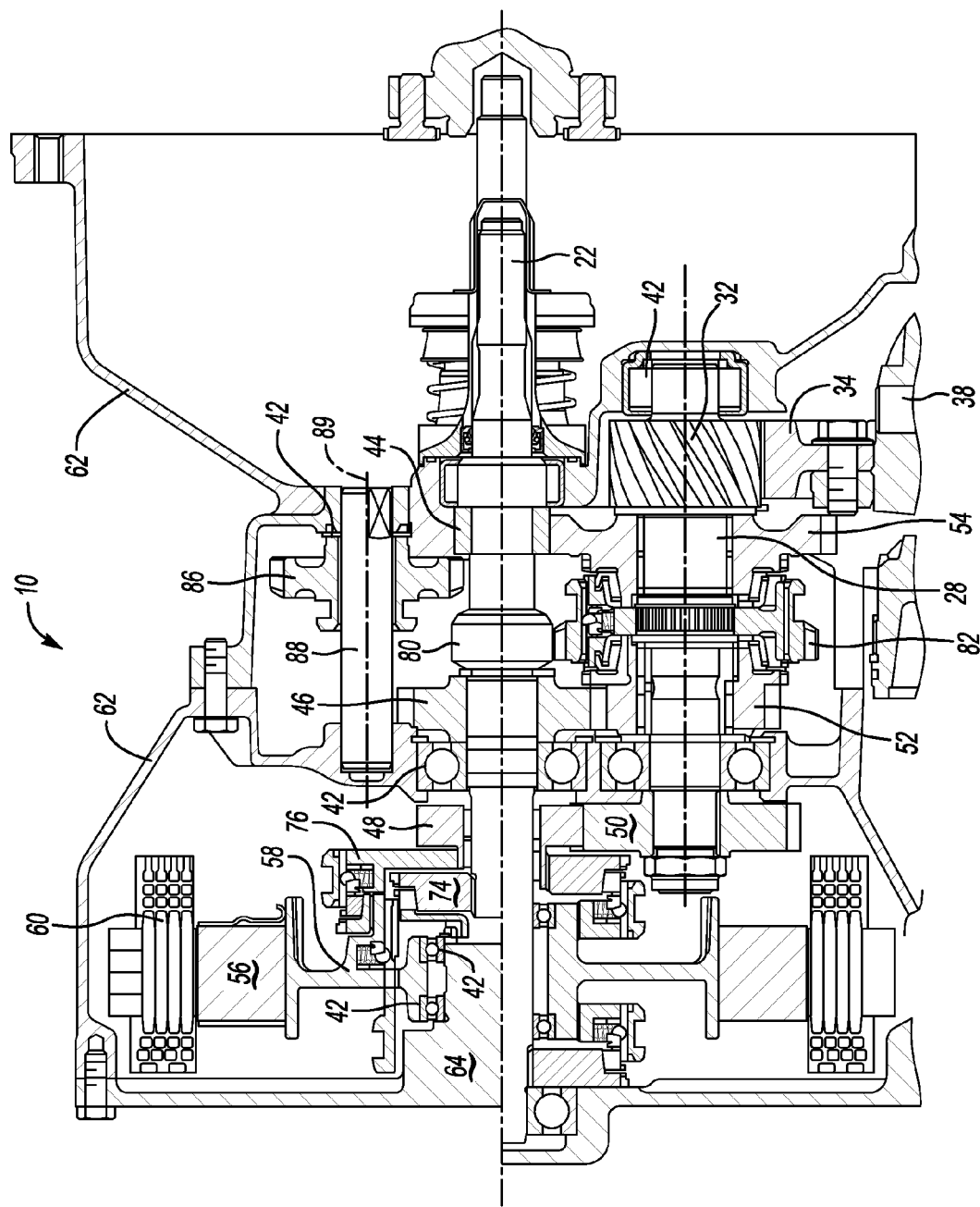
FIG. 2 is a schematic illustration in partial cross-sectional and fragmentary view of a hybrid transmission included in the hybrid powertrain of FIG. 1.

Referring to the drawings, wherein identical reference numbers are used to refer to identical components throughout the several views, FIG. 1 shows a hybrid powertrain 10 that has an engine 12 and a hybrid transmission 14. As discussed, herein, the transmission 14 has only a single electric motor-generator 16, and is controllable to provide three fixed gear ratios, each of which can be powered by the engine 12 only, or can be powered by the engine with torque assistance from the motor-generator 16 to fill a torque hole after an upshift, can be powered by the motor-generator 16 only, can use the motor-generator 16 to start the engine 12, and can provide regenerative braking and motor-charging operating modes. FIG. 2 is a cross-sectional view of the transmission 14 with the same components as in the stick diagram view of FIG. 1.

The transmission 14 can be referred to as a three-speed automated manual transmission (AMT), manual transmission automated (MTA), or a three-speed electric manual transmission (EMT), because it is arranged similarly to a three-speed manual transmission, but gear shifts are automated under the control of an electronic controller 18. There is no requirement to depress a clutch to shift gears as is required with a manual transmission. The transmission controller 18 controls synchronizers to synchronize speeds of and engage components to affect a shift, as described herein.

The engine 12 may be an internal combustion engine or any other type of prime mover. The engine 12 has a crankshaft 20 that can be connected with an input shaft 22 of the transmission 14 when a clutch 24 is engaged. The clutch 24 can be referred to as an engine disconnect clutch, as it allows the engine 12 to be disconnected from the transmission 14 when not engaged. The crankshaft 20 and the input shaft 22 rotate about a first axis of rotation 26.

A countershaft 28 is arranged parallel to the input shaft 22 and rotates about a second axis of rotation 30. An output member 32 is a fixed gear that is mounted to the countershaft 28 to rotate in unison with the countershaft. As used herein, two components "rotate in unison" and are connected "for common rotation" when they are physically connected such that they must rotate together at the same speed. The output member 32 meshes with another gear 34 that is part of a final drive 36 including a differential 38. The differential 38 provides a path for the driving torque of the output member 32 to wheel axles 40A, 40B that can be either for front wheels or rear wheels. The final drive 36 and wheel axles 40A, 40B rotate about and establish a third axis of rotation 41 that is generally parallel with the first axis of rotation 26 and the second axis of rotation 30. Bearings 42 shown throughout the powertrain 10 are positioned between the rotatable members and a stationary member to provide support for the rotatable member. The bearings 42 are annular.

A plurality of intermeshing gear pairs are arranged on the input shaft 22 and on the countershaft 28. Specifically, gears 44 and 46 are mounted on and rotate in unison with the input shaft 22. Gears 44 and 46 are referred to as fixed gears because they are continuously fixed to the input shaft 22 to rotate in unison with the input shaft 22. Gear 48 is mounted on and rotates about the input shaft 22 but is not continuously connected for rotation with the input shaft 22. That is, gear 48 can rotate around the input shaft 22 unless synchronizers 74 and 76 are engaged as described herein. Gear 50 is a fixed gear mounted on and rotating in unison with the countershaft 28. Gears 52 and 54 are mounted on and rotate about the countershaft 28 but are not continuously connected for rotation with the countershaft 28.

Gears 48, 52 and 54 are referred to as synchronizable gears because each is synchronizable by a controlled synchronizer to engage in a synchronized manner with another component of the transmission 14 as described herein. Gear 44 meshes with gear 54 to form a first gear pair that can provide a first gear ratio of torque of the countershaft 28 to torque of the input shaft 22 when gear 54 is engaged with the countershaft 28 by synchronizer 78.

Gear 48 meshes with gear 50 to form a second gear pair that provides a second second gear ratio of torque of the countershaft 28 to torque of the input shaft 22 when synchronizers 74 and 76 are engaged as described herein. Gear 46 meshes with gear 52 to form a third gear pair that provides a third gear ratio of torque of the countershaft 28 to torque of the input shaft 22 when gear 52 is engaged with the countershaft 28 by synchronizer 78. As used herein, a "gear ratio" is the ratio of torque of the countershaft 28 to torque of the input shaft 22. A speed ratio corresponding to each gear ratio is associated which each gear ratio. As used herein, a "speed ratio" is the ratio of the rotational speed of the input shaft 22 to the rotational speed of the countershaft 28. As is indicated by the relative sizes of the gears in FIG. 1, the first gear ratio has a greater numerical value than the second gear ratio, which has a greater numerical value than the third gear ratio. The first gear ratio can be referred to as establishing first gear in the transmission 14. The second gear ratio can be referred to as second gear, and represents an upshift to a lower numerical gear ratio (and higher speed ratio) than the first gear ratio. The third gear ratio can be referred to as third gear, and represents an upshift from the second gear ratio to a lower numerical gear ratio (and higher speed ratio) than the second gear ratio.

The electric motor-generator 16 includes an annular rotor (R) 56 supported on a rotor hub 58 and an annular stator (S) 60 radially surrounding the rotor 56 and grounded to a stationary member 62 such as a transmission housing. A stationary shaft 64 supports the rotor 56 for rotation about the stationary shaft 64 via bearings 42. The stationary shaft 64 is aligned with the input shaft 22 so that the rotor 56 rotates about the first axis of rotation 26.

A motor control module 65 having an integrated motor controller 66 and power electronics 68 is operatively connected to the stator 60 and to an energy storage device 70 such as a battery. The motor controller 66 controls the motor-generator 16 to function as a motor by providing stored electric energy from the energy storage device 70 to windings of the stator 60. The power electronics 68 can include a power inverter to provide electrical energy from the energy storage device 70 to the stator 60 in the form required by the stator 60. For example, if the motor-generator 16 uses alternating current, the power electronics 68 may include a power inverter that converts direct current to alternating current required for three phase windings of the stator 60, which alternating current is supplied along transfer conductors 72. In other embodiments, the power electronics 68 can condition the electrical energy to provide direct current to a motor requiring such. The motor controller 66 can be operatively connected with the transmission controller 18 and with any other powertrain controllers to respond to control signals from the controller 18 according to a stored algorithm executed by a processor of the controller 18 in order to implement a desired operating mode in response to vehicle operating conditions.

A first synchronizer 74 is mounted on and rotates in unison with the input shaft 22. The first synchronizer 74 is a single-sided synchronizer and is shiftable to the left to slide along the input shaft 22 to which it is splined to engage the rotor hub 58, thereby synchronizing the rotation of the rotor 56 and the input shaft 22.

A second synchronizer 76 is mounted on the input shaft 22 and rotates about the first axis of rotation 26 but is not connected to rotate in unison with the input shaft 22. Instead, the second synchronizer 76 is mounted to rotate in unison with the synchronizable gear 48, which also rotates about the first axis of rotation 26 but not in unison with the input shaft 22. In other words, both the gear 48 and the synchronizer 76 are arranged as sleeves on input shaft 22. The second synchronizer 76 is a single-sided synchronizer shiftable to the left to engage the rotor hub 58 to synchronize rotation of the gear 48 and the rotor 56.

If the first synchronizer 74 is engaged and the second synchronizer 76 is not engaged, torque can be transferred from the motor-generator 16 to the input shaft 22 when the motor-generator 16 functions as a motor, and torque can be transferred from the input shaft 22 to the motor-generator 16 when the motor-generator 16 functions as a generator.

If the first synchronizer 74 is not engaged and the second synchronizer 76 is engaged, then torque can be transferred from the motor-generator 16 to the countershaft 28 through the second set of intermeshing gears 48, 50 without affecting rotation of the input shaft 22.

If both the first synchronizer 74 and the second synchronizer 76 are engaged, then the synchronizable gear 48 is operatively connected to the input shaft 22 for rotation in unison with the input shaft 22 through the rotor hub 58 and the synchronizers 74, 76, and torque is transferred from the input shaft 22 to the countershaft 28 at the second gear ratio. The engine 12, the motor-generator 16, or both can add torque to the input shaft 22 when both the first and second synchronizers 74, 76 are engaged.

A double-sided synchronizer 78 is mounted on and rotates in unison with the countershaft 28. The double-sided synchronizer 78 is also referred to as a dual synchronizer. The double-sided synchronizer 78 is shiftable to the left to slide along the countershaft 28 to which it is splined to engage the synchronizable gear 52 by synchronizing rotation of the gear 52 with the countershaft 28, causing torque transfer from the input shaft 22 to the countershaft 28 through the third gear pair 46, 52 at the third gear ratio. The double-sided synchronizer 78 is shiftable to the right to slide along the countershaft 28 to engage the synchronizable gear 54 by synchronizing rotation of the gear 54 with the countershaft 28, causing torque transfer from the input shaft 22 to the countershaft 28 through the first gear pair 44, 54 at the first gear ratio.

The input shaft 22 also supports a first gear 80 that is mounted on and rotates in unison with the input shaft 22 about the first axis of rotation 26. Stated differently, the first gear 80 is fixed to the input shaft 22. The synchronizer 78 supports a second gear 82 on a movable sleeve 84 of the synchronizer 78. The second gear 82 is free from contact with the first gear 80. In other words, the second gear 82 is not configured to mesh with the first gear 80, but is aligned with the first gear 80 when the synchronizer 78 is in a neutral position in which it is not engaged with either gear 52 or gear 54. An idler gear 86 is supported by a bearing 42 to rotate about a shaft 88, which can be a nonrotating shaft, establishing an axis of rotation 89. The idler gear 86 is actually arranged in a triangular formation with the gears 80, 82 so that the axis of rotation 89 and the axes of rotation 26, 30 form a triangle. The idler gear 86 can be shifted by the transmission controller 18 to mesh with both the gears 80, 82. Because of the idler gear 86, the direction of rotation of the countershaft 28 is the same as the direction of rotation of the input shaft 22. The gear pairs 44, 54; 48, 50; and 46, 52 are arranged to provide a forward rotation at a gear 34 that rotates with the countershaft 28 and serves as an output member of the transmission 14. The gear train 80, 86, 82 provides an opposite reverse rotation at gear 34.

The transmission controller 18 controls the first synchronizer 74, the second synchronizer 76, the third synchronizer 78, and the idler gear 86. Although not shown for clarity in the drawings, the clutch 24 is also operatively connected to and controlled by the transmission controller 18 or a separate controller. The clutch 24 can be actuated by the transmission controller 18 hydraulically, such as by control of the flow of hydraulic fluid through a valve body (not shown) to engage the clutch 24. Alternatively, the clutch 24 can be electrically actuated under the control of the transmission controller 18, or actuated by any other suitable method under the control of the transmission controller 18.

The electric motor-generator 16 can be controlled to function as a motor to add torque to the input shaft 22 when only the first synchronizer 74 is engaged and the clutch 24 is engaged, enabling the motor-generator 16 to start the engine 12. Once the engine 12 is started, the transmission 14 can be launched in first gear by shifting the dual synchronizer 78 to the right to engage the synchronizable gear 54 with the countershaft 28. During this launch, the first synchronizer 74 can be disengaged, if an engine-only launch is desired, or can remain engaged to allow the motor-generator 16 to be controlled to function as a motor, adding torque at the input shaft 22 to assist the engine 12 in the launch. Alternatively, the motor-generator 16 can be controlled to function as a motor when the clutch 24 is disengaged, the first synchronizer 74 is engaged, and the dual synchronizer 78 is shifted to the right to engage gear 54 with the countershaft 28, to provide an electric-only launch (i.e., driving torque provided to the output member 28 via the electric motor-generator 16 and not the engine 12), and/or to continue after launch to provide an electric-only operating mode (i.e., a zero emissions vehicle ("ZEV") mode) in first gear (i.e., driving torque provided to the axles 40A, 40B via the electric motor-generator 16 and not the engine 12).

The transmission controller 18 is programmed to shift the transmission 14 from first gear to second gear at a predetermined speed of the countershaft 28, and to shift from second gear to third gear at another (higher) predetermined speed of the countershaft 28. To prepare for the shift from first gear to second gear, while the clutch 24 is engaged and the dual synchronizer 78 is shifted to the right in the first gear ratio, the motor-generator 16 can begin operating to engage with the second gear 48 via the second synchronizer 76 to provide power through the gear pair 48, 50. The clutch 24 is disengaged, and the dual synchronizer 78 disengages from the synchronizable gear 54 to decouple gear 54 from the input shaft 22. Once the dual synchronizer 78 has completely disengaged gear 54, an electric-only (ZEV) second gear mode is established with torque transfer from the electric motor-generator 16 to the countershaft 28 through the second pair 48, 50. During the electric-only (ZEV) second gear mode, the first synchronizer 74 can be engaged to synchronize rotation of the rotor 56 with the input shaft 22. The engine speed is then synchronized with the input shaft 22, and the clutch 24 is engaged so that the engine 12 adds torque to the input shaft 22. If the first synchronizer 74 is engaged to synchronize rotation of the rotor 56 with the input shaft 22, the torque of the engine 12 and of the motor-generator 16 can be combined through the second gear pair 48, 50. If the motor-generator 16 is unpowered while the first synchronizer 74, the second synchronizer 76 and the clutch 24 are engaged, then an engine-only second gear operating mode is established. A power-on downshift from second gear to first gear could be accomplished in a similar manner with torque assist from the electric motor-generator 16.

During the engine-only second gear operating mode (with synchronizers 74, 76 and clutch 24 engaged), the transmission 14 can be prepared for a shift to third gear by controlling the motor-generator 16 to function as a motor to add torque to the countershaft 28 through the gear pair 48, 50, and shifting the synchronizer 78 to the left in FIG. 1 to utilize the engine 12 to bring the countershaft 28 to the third gear ratio by adding torque through the gear pair 46, 52. The second synchronizer 76 can then be disengaged, the motor-generator 16 unpowered and/or synchronizer 74 disengaged, and the engine 12 can drive the countershaft 28 through the third gear pair 46, 52 in an engine-only third gear operating mode. If extra motor torque is desired when the transmission 14 is in the engine-only third gear operating mode, the first synchronizer 74 can be engaged to enable the first motor-generator 16 to function as a motor to add torque to the input shaft 22, establishing an engine-only operating mode with motor assist. If desired, a third gear electric-only (ZEV) operating mode can be established in which only the motor-generator 16 drives the transmission 14 by adding torque to the input shaft 22 which is transferred to the countershaft 28 through the third gear pair 46, 52 when the first synchronizer 74 is engaged, the second synchronizer 76 is not engaged, the dual synchronizer 78 is shifted to the left to engage the gear 52 and synchronize rotation of gear 52 with the countershaft 28, and the clutch 24 disconnected. A downshift from third gear to second gear (power-on or coasting) can be accomplished with torque assist from the electric motor-generator 16 in a similar manner.

The transmission 14 can be controlled to provide a regenerative braking operating mode utilizing the transmission controller 18 and the motor controller 66. When vehicle operating conditions indicate that the axles 40A, 40B should be slowed, if either synchronizer 76 or both synchronizer 74 and 78 are engaged so that torque transfer is occurring between the input shaft 22 and the countershaft 28, the motor-generator 16 can be controlled to function as a generator, thereby converting some of the torque at the countershaft 28 into stored energy in the energy storage device 70, and slowing the countershaft 28 and ultimately the wheel axles 40A, 40B. The regenerative braking mode can occur whether or not the engine 12 is operatively connected to the input shaft 22. That is, the disconnect clutch 24 can be either engaged or disengaged.

The transmission 14 can also be controlled to increase the state-of-charge of the energy storage device 70 in a charging mode when the engine 12 is on, the disconnect clutch 24 is engaged, and the motor-generator 16 is controlled by the controller 66 to function as a generator, thereby converting some of the torque of the input shaft 22 into stored electrical energy in the energy storage device 70.

Figure 3:
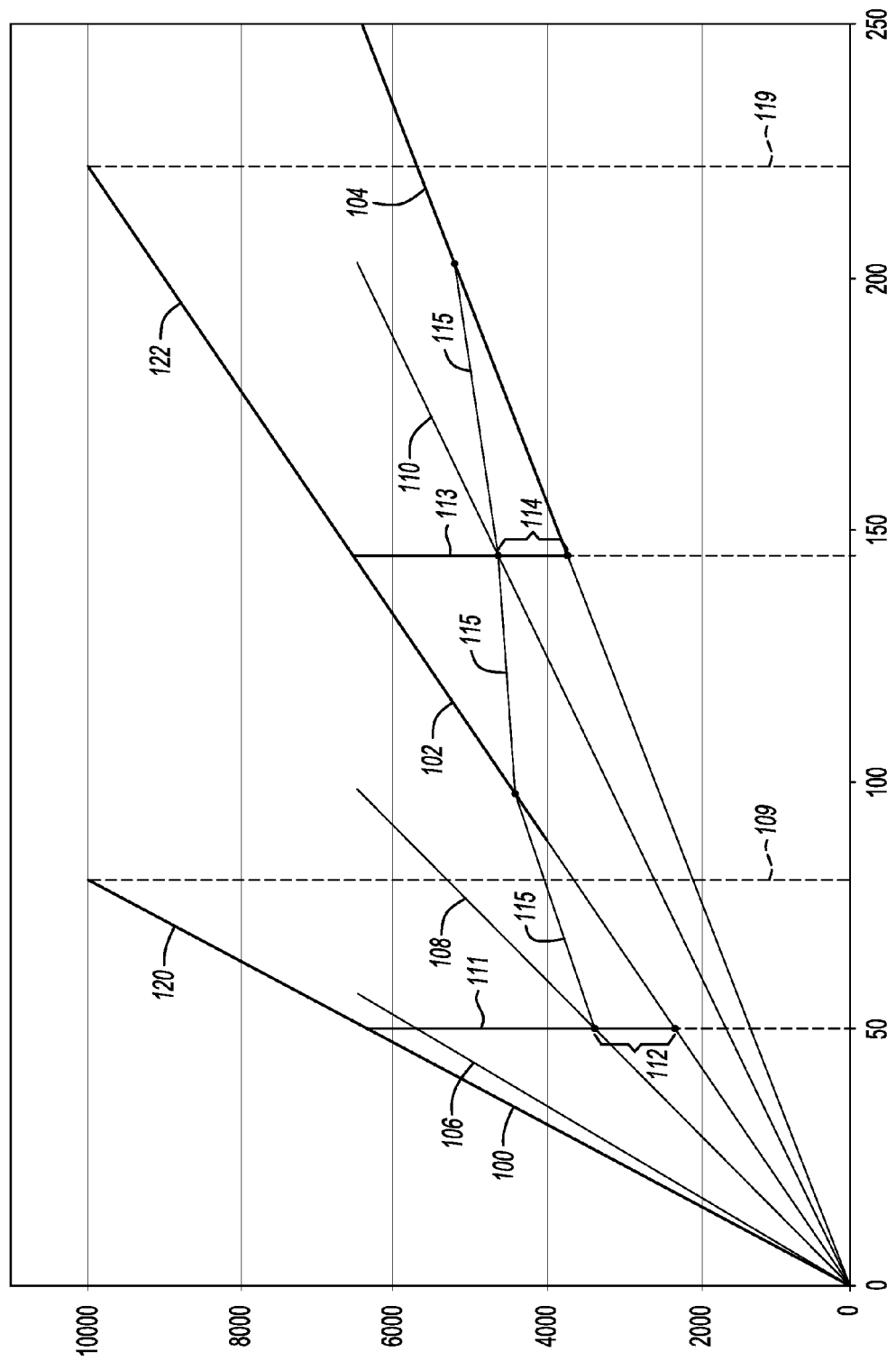
FIG. 3 is a chart of engine speed and motor speed in revolutions per minute (rpm) versus vehicle speed in kilometers per hour (kph) for the powertrain of FIGS. 1 and 2.

FIG. 3 is a chart of engine speed and motor speed on the vertical axis in revolutions per minute (rpm) versus vehicle speed on the horizontal axis in kilometers per hour (kph).

The vehicle speed is of an example vehicle on which the powertrain 10 is installed. Many of the available operating modes of the powertrain 10 are described herein with respect to the ranges of engine speed and vehicle speed over which they are established. Additionally, the chart of FIG. 3 illustrates the ability of the electric motor 16 to supplement engine torque during and following a gear ratio shift, eliminating some of the loss of mechanical advantage between shifts in the three-speed transmission 14 in comparison to a manual transmission having additional speed ratios available between those of the transmission 14.

In FIG. 3, line 100 indicates an example ratio of engine speed to vehicle speed when the powertrain 10 of FIGS. 1 and 2 is in the first gear ratio with clutch 24 engaged and the synchronizer 78 shifted to the right so that torque is transferred through the first set of intermeshing gears 44, 54. The speed of the engine 12 is indicated in revolutions per minute (rpm) on the vertical axis. Vehicle speed of an example vehicle having the powertrain 10 is indicated in kilometers per hour (kph) on the horizontal axis. Line 102 indicates an example ratio of engine speed to vehicle speed when the powertrain 10 of FIGS. 1 and 2 is in a second gear ratio with clutch 24 engaged and synchronizers 74, 76 engaged so that torque is transferred through the second set of intermeshing gears 48, 50. Line 104 indicates an example ratio of engine speed to vehicle speed when the powertrain 10 of FIGS. 1 and 2 is in a third gear ratio with clutch 24 engaged and the synchronizer 78 shifted to the left so that torque is transferred through the third set of intermeshing gears 46, 52. Line 106 indicates an example ratio of engine speed to vehicle speed when the powertrain 10 of FIGS. 1 and 2 is in a reverse gear ratio with clutch 24 engaged, the idler gear 86 moved into meshing engagement with the gears 80, 82, and the synchronizer 78 in a neutral position so that torque is transferred through the reverse set of intermeshing gears 80, 82, 86.

In FIG. 3, lines 108 and 110 indicate additional ratios of engine speed to vehicle speed not available in the three-speed transmission 14 of FIGS. 1 and 2 but that would be available in a typical conventional transmission having two additional forward speed ratios. For example, a conventional manual transmission may have five available forward ratios of engine speed to vehicle speed, 100, 108, 102, 110, 104, associated with five fixed gear ratios, in which case the second ratio 102 of the transmission 14 would be the third ratio of the conventional transmission, and the third ratio 104 of the transmission 14 would be the fifth ratio of the conventional transmission. As is evident in FIG. 3, there is a loss in mechanical advantage 112 in a shift along shift line 111 at a vehicle speed of approximately 50 kph from ratio 100 to ratio 102 in the transmission 14 in comparison to a shift from ratio 100 to ratio 108 in the conventional manual transmission. Similarly, there is a loss in mechanical advantage 114 in a shift along shift line 113 at a vehicle speed of about 145 kph from ratio 102 to ratio 104 in the transmission 14 in comparison to a shift from speed ratio 102 to speed ratio 110 in the conventional manual transmission.

The transmission 14 has the advantage of being able to use torque assistance provided by the electric motor 16 to help reduce the loss in mechanical advantage associated with fewer fixed gears ratios and wider ratios steps between gear ratios. For example, the electric motor 16 can be controlled to be on at a speed prior to the vehicle speed of 50 kph (the vehicle speed associated with a predetermined speed of the output member 32 at which the shift occurs from the first gear ratio 100 to the second gear ratio 102). When vehicle speed reaches approximately 50 kph, at the shift line 111, synchronizer 76 is engaged when motor-generator 16 is synchronized with the speed of gear 48 to power the transmission 14 by the motor-generator 16. Clutch 24 is disengaged. Synchronizer 78 is disengaged from gear 54 and moved to its neutral position and synchronizer 74 is engaged. The engine speed is synchronized with that of the input shaft 22, and the clutch 24 is reengaged. The electric motor-generator 16 is kept on during the shift and to a higher vehicle speed (corresponding with line 109) beyond the shift line 111 to supplement engine torque, thereby substantially substituting for the lost mechanical advantage 112 between second gear of a conventional manual transmission (line 108) and second gear (line 102) of the transmission 14. This may be referred to as "filling in" torque with the electric motor 16, or using the electric motor 16 for "torque fill-in". Line 115 indicates the post-shift engine speed as affected by operation of the motor 16. Line 120 indicates the speed of the rotor 56 of the electric motor-generator 16. At a vehicle speed of about 75 kph, the rotor 56 reaches its maximum rated speed, and synchronizer 74 is disengaged so that the electric motor-generator 16 is disconnected from powerflow in the transmission 14 and can freely spin to a lower speed as indicated by line 109.

Accordingly, the electric motor-generator 16 is controlled to be on over a range of vehicle speeds (and associated speeds of the output member 32) prior to and after each of the predetermined speeds at which gear shifts occur in the transmission 14. This enables the electric motor-generator 16 to add torque when engine torque alone would be less than the torque that would be provided by the engine 12 through a conventional manual transmission having the additional gear ratios 108 and 110 indicated in FIG. 3. As is apparent in FIG. 3, the predetermined vehicle speeds at which shifts occur in the transmission 14 correspond with engine speeds of approximately 6500 rpm, which may be a predetermined maximum engine speed. A predetermined speed of the output member 32 corresponds with the predetermined maximum engine speeds by a formula dependent on the gear ratios of the sets of intermeshing gears and tire size.

At about 145 kph, the engine 12 again reaches its predetermined rated speed and is shifted along shift line 113 into the third gear ratio 104 by powering the motor-generator 16, disengaging synchronizer 74, and shifting the synchronizer 78 to the left in FIGS. 1 and 2. The engine speed is synchronized with the input shaft 22 and the clutch 24 is reengaged. Synchronizer 76 can remain engaged, and the electric motor-generator 16 can be controlled to be on from some vehicle speed prior to the shift line 113, such as a vehicle speed of 130 kph, to a vehicle speed beyond the shift line 113 to supplement engine torque and simulate the missing ratio associated with line 110 that would be available in a conventional manual transmission. The electric motor-generator 16 could remain on to supplement engine torque up to a predetermined maximum vehicle speed, if desired or until the motor-generator 16 reaches its predetermined maximum speed, indicated as occurring at a vehicle speed corresponding with line 119 in FIG. 3. Line 122 indicates the speed of the rotor 56 of the electric motor-generator 16. At a vehicle speed of about 225 kph, the rotor 56 again reaches its maximum rated speed, and synchronizer 74 is disengaged so that the electric motor-generator 16 is disconnected from powerflow in the transmission 14 and can freely spin to a lower speed as indicated by line 119.

The transmission 14 requires only three sets of intermeshing gear pairs 44, 54; 48, 50; 46, 52 to provide three forward ratios, only three synchronizers 74, 76, 78, and only a single electric motor-generator 16 arranged coaxially with the engine 12. The additional reverse gear set 80, 82, 86 is also provided. The transmission 14 has a relatively short overall axial length, enabling packaging in many applications. Electric-only (ZEV) operating modes are available in each of the gear ratios, torque support is available from the motor-generator 16 to fill ratio gaps that would otherwise occur during the shift of an engine-only mode, and the motor-generator 16 is also available to start the engine 12 and increase launch torque. Regenerative braking modes and charging of the energy storage device 70 by the engine 12 is also available, as discussed above.

While the best modes for carrying out the invention have been described in detail, those familiar with the art to which this invention relates will recognize various alternative designs and embodiments for practicing the invention within the scope of the appended claims.

The invention claimed is:

1. A combination of an engine and a transmission comprising:
    an input shaft rotatable about a first axis of rotation;
    a countershaft arranged substantially parallel with the input shaft and rotatable about a second axis of rotation;
    an output member operatively connected to rotate in unison with the countershaft;
    multiple pairs of intermeshing gears; wherein each of the pairs of intermeshing gears includes a respective synchronizable gear that rotates about one of the input shaft and the countershaft, and a respective fixed gear mounted to the other one of the input shaft and the countershaft to rotate in unison therewith; each pair of intermeshing gears establishing a different gear ratio of torque of the countershaft to torque of the input shaft when the respective synchronizable gear is operatively engaged with said one of the input shaft and the countershaft;
    an electric motor having a rotor concentric with and rotatable about the first axis of rotation;
    a plurality of selectively engageable synchronizers including a first synchronizer and a second synchronizer;
    wherein each of the pairs of intermeshing gears requires engagement of at least one of the synchronizers to synchronize the respective synchronizable gear with said one of the input shaft and the countershaft;
    wherein the first synchronizer is selectively engageable to synchronize rotation of the rotor with the input shaft, wherein the second synchronizer is selectively engageable to synchronize rotation of the rotor with one of said synchronizable gears which rotates about the input shaft; the electric motor thereby being operable to apply torque at the input shaft when the first synchronizer is engaged;
    a transmission controller operable to control engagement of the synchronizers;
    a first gear mounted to the input shaft to rotate about the first axis of rotation in unison with the input shaft;
    a second gear mounted to the dual synchronizer to rotate in unison with the dual synchronizer and the countershaft, and axially aligned with but free from contact with the first gear;
    an idler gear axially movable to mesh with both the first gear and the second gear to transfer torque from the input shaft to the countershaft at a reverse speed ratio between the input shaft and the countershaft;
    wherein the engine is operatively connectable to the input shaft to add torque at the input shaft;
    wherein the first synchronizer is engaged and the electric motor is powered to add torque to the input shaft when the engine is operatively connected to the input shaft during an upshift from one of said gear ratios to a numerically lower one of said gear ratios;
    wherein the multiple pairs of intermeshing gears include a first pair, a second pair, and a third pair of intermeshing gears providing a first gear ratio, a second gear ratio, and a third gear ratio having respective decreasing numerical ratios of torque of the countershaft to torque of the input shaft; and
    wherein the plurality of selectively engageable synchronizers includes a dual synchronizer selectively engageable to synchronize rotation of the synchronizable gear of the first pair of intermeshing gears with one of the input shaft and the countershaft and alternately selectively engageable to synchronize rotation of the synchronizable gear of the third pair of intermeshing gears with said one of the input shaft and the countershaft.

2. The combination of the engine and the transmission of claim 1, wherein the second synchronizer is selectively engageable to synchronize rotation of the rotor with the synchronizable gear of the second pair of intermeshing gears.

3. The combination of the engine and the transmission of claim 1, wherein the dual synchronizer synchronizes rotation of the synchronizable gear of the first pair of intermeshing gears with the countershaft and alternately synchronizes rotation of the synchronizable gear of the third pair of intermeshing gears with the countershaft.

4. The combination of the engine and the transmission of claim 1, wherein the electric motor is powered to add torque to the input shaft from a speed of the countershaft less than a predetermined speed at which the upshift occurs to a speed to the countershaft greater than the predetermined speed.

5. The combination of the engine and the transmission of claim 1; and further comprising:
    a clutch selectively engageable to operatively connect the engine to the input shaft; and
    wherein the first synchronizer and any other one of the synchronizers are engaged and the electric motor is powered to add torque to the input shaft when the clutch is disengaged, thereby establishing an electric-only operating mode.

6. The combination of the engine and the transmission of claim 1; and
    wherein the first synchronizer and any other one of the synchronizers are engaged and the electric motor is powered to function as a generator when the engine is on and operatively connected to the input shaft, thereby reducing torque at the countershaft in a regenerative braking operating mode.

7. The combination of the engine and the transmission of claim 1; and further comprising:
    an energy storage device operatively connected to the electric motor; and
    wherein the first synchronizer is engaged and the electric motor is powered to function as a generator when the engine is on and operatively connected to the input shaft, the engine thereby charging the energy storage device.

8. The combination of the engine and the transmission of claim 1; and
    wherein the first synchronizer is engaged and the electric motor is powered thereby adding torque to the input shaft and starting the engine when the engine is operatively connected to the input shaft.

9. A combination of an engine and a transmission comprising:
an input shaft rotatable about a first axis of rotation;
a countershaft arranged substantially parallel with the input shaft and rotatable about a second axis of rotation;
an output member operatively connected to rotate in unison with the countershaft;
a first pair, a second pair, and a third pair of intermeshing gears providing a first, a second, and a third respective decreasing numerical ratio of torque of the countershaft to torque of the input shaft; wherein each of the pairs of intermeshing gears includes a respective synchronizable gear that rotates about one of the input shaft and the countershaft, and a respective fixed gear mounted to the other one of the input shaft and the countershaft to rotate in unison therewith;
an electric motor having a rotor concentric with and rotatable about the first axis of rotation;
a plurality of selectively engageable synchronizers including a first synchronizer and a second synchronizer; wherein each of the pairs of intermeshing gears requires engagement of at least one of the synchronizers to synchronize the respective synchronizable gear with said one of the input shaft and the countershaft; wherein the first synchronizer is selectively engageable to synchronize rotation of the rotor with the input shaft, wherein the second synchronizer is selectively engageable to synchronize rotation of the rotor with the synchronizable gear of the second pair of intermeshing gears;
a transmission controller operable to control engagement of the synchronizers;
a first gear mounted to the input shaft to rotate about the first axis of rotation in unison with the input shaft;
a second gear mounted to the dual synchronizer to rotate in unison with the dual synchronizer and the countershaft, and axially aligned with and free from contact with the first gear;
an idler gear axially movable to mesh with both the first gear and the second gear to transfer torque from the input shaft to the countershaft at a reverse speed ratio between the input shaft and the countershaft;
wherein the plurality of selectively engageable synchronizers includes a dual synchronizer selectively engageable to synchronize rotation of the synchronizable gear of the first pair of intermeshing gears with the countershaft and alternately selectively engageable to synchronize rotation of the synchronizable gear of the third pair of intermeshing gears with the countershaft;
wherein the electric motor is powered to add torque to the input shaft and the first synchronizer is engaged during a shift from the first gear ratio to the second gear ratio and during a shift from the second gear ratio to the third gear ratio; and
wherein the engine is operatively connectable to add torque at the input shaft.

10. The combination of the engine and the transmission of claim 9; and further comprising:
a clutch selectively engageable to operatively connect the engine to the input shaft; and
wherein the first synchronizer and any other one of the synchronizers are engaged and the electric motor is powered to add torque to the input shaft when the clutch is disengaged, thereby establishing an electric-only operating mode.

11. The combination of the engine and the transmission of claim 9; and further comprising:
a clutch selectively engageable to operatively connect the engine to the input shaft; and
wherein the first synchronizer and any other one of the synchronizers are engaged and the electric motor is powered to function as a generator when the engine is on and the clutch is engaged, thereby reducing torque at the countershaft in a regenerative braking operating mode.

12. The combination of the engine and the transmission of claim 9; and further comprising:
a clutch selectively engageable to operatively connect the engine to the input shaft;
an energy storage device operatively connected to the electric motor; and
wherein the first synchronizer is engaged and the electric motor is powered to function as a generator when the engine is on and the clutch is engaged, thereby charging the energy storage device.

13. The combination of the engine and the transmission of claim 9; and further comprising
a clutch selectively engageable to operatively connect the engine to the input shaft; and
wherein the first synchronizer is engaged and the electric motor is powered thereby adding torque to the input shaft and starting the engine when the clutch is engaged.

* * * * *